(12) United States Patent
Durand et al.

(10) Patent No.: US 6,573,304 B1
(45) Date of Patent: Jun. 3, 2003

(54) METHOD FOR OBTAINING POLYOLS AND POLYOL THUS OBTAINED

(75) Inventors: Gérard Durand, Le Pecq (FR); Franck Hubert, Cerny (FR); Jean-Charles Marechal, Meylan (FR); Hélène Migeon, Fontaines sur Saône (FR); Gilles Tersac, Champcueil (FR)

(73) Assignee: Techniques du Batiment et de l'Industrie S.A.R.L., Vertaizon (FR)

( * ) Notice: Subject to any disclaimer, the term of this patent is extended or adjusted under 35 U.S.C. 154(b) by 0 days.

(21) Appl. No.: 09/194,978

(22) PCT Filed: Jun. 4, 1997

(86) PCT No.: PCT/FR97/00984
§ 371 (c)(1),
(2), (4) Date: Oct. 15, 1999

(87) PCT Pub. No.: WO97/46611
PCT Pub. Date: Dec. 11, 1997

(30) Foreign Application Priority Data

Jun. 4, 1996 (FR) .............................. 96 07031

(51) Int. Cl.⁷ ................................ C08J 11/04
(52) U.S. Cl. ........................................ 521/48; 521/48.5
(58) Field of Search .................... 521/48, 48.5

(56) References Cited

U.S. PATENT DOCUMENTS

| 3,488,298 A | 1/1970 | Barkey et al. |
| 3,907,868 A | 9/1975 | Currie et al. |
| 4,758,607 A | 7/1988 | Hallmark et al. |
| 4,873,268 A | * 10/1989 | Hallmark et al. .......... 521/48.5 |
| 5,266,601 A | 11/1993 | Kybert et al. |
| 5,451,611 A | 9/1995 | Chilukuri et al. |

FOREIGN PATENT DOCUMENTS

| EP | 0710686 | 10/1995 |

\* cited by examiner

*Primary Examiner*—James J. Seidleck
*Assistant Examiner*—Olga Asinovsky
(74) *Attorney, Agent, or Firm*—Horst M. Kasper

(57) ABSTRACT

The invention relates to the field of polymer chemistry. It features a method for obtaining polyols consisting in a first step in reacting glycols, i.e. plurialcohols with a functionality at least equal to two (MEG,DEG,DPG, . . . ) on polyethyleneterephthalate (PET) in the presence of a transesterefication catalyst (CAT) (MEG,DEG,DPG; . . . ), on polyethyleneterephthalate (PET) in the presence of a glycolysis catalyst (CAT), then in a last step, comprises, in distilling the free glycols. The method is characterized in that a step subsequent to the first and prior to, or simultaneous with, the last step, comprises the glycolysis catalyst deactivation by a deactivating agent (DES). As an example, the glycolysis reaction catalyst (CAT) is one of the agents of the group comprising zinc acetate and manganese acetate, amines such as triethylamine and tributylamine, and the selected deactivating agent is phosphoric acid at 85%.

20 Claims, 5 Drawing Sheets

METHOD FOR OBTAINING POLYOLS AND POLYOL THUS OBTAINED

BACKGROUND OF THE INVENTION

1. Field of the Invention

Figure 1:
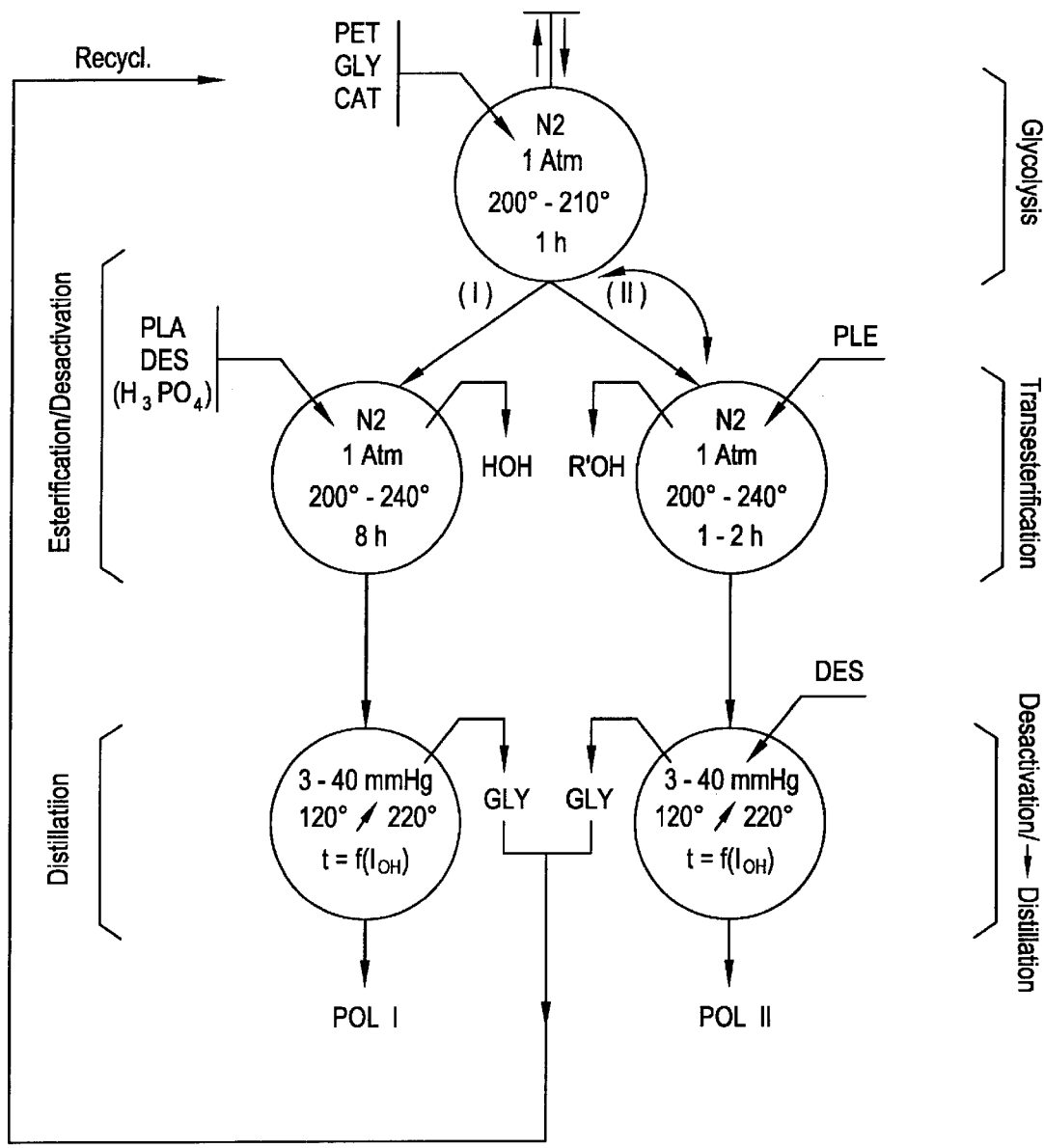

The present invention relates to the field of chemistry and its object is a general method for obtaining polyols, in particular polyesterols, from polyethylene terephthalate (PET), in particular PET production residuals or consumption waste, and variants to this method and products obtained, especially destined to the production of cellular materials such as polyurethane foams (PUR), and polyisocyanurate foams (PIR).

2. Description of the Related Art Including Information Disclosed Under 37 CFR 1.97 and 1.98

It is called to mind that the manner of preparing polyols by degradation of the polyethylene terephthalates by an inverse reaction of their synthesis reaction, so-called "glycolysis", according to which the PET is heated in the presence of an excess of glycol (GLY), for example the monoethylene glycol (MEG), has been known for a long time. The major inconveniences of the polyols thus obtained in regard to their destination are their propensity for precipitating solids during their storage at ordinary temperature, as well as their elevated viscosity.

A recent prior art reference has proposed various solutions to attempt to remedy these inconveniences. For example, DE 3,435,014 (BAUER), EP 0,248,578 (BENTLEY et al.), U.S. Pat. No. 4,539,341 (HALLMARK), U.S. Pat. No. 4,559,370 (BLANPIED), U.S. Pat. No. 4,652,591, and U.S. Pat. No. 4,714,717 (LONDRIGAN) have proposed an esterification of the obtained polyols, whereas the patents EP 0,134,661 (CHARDONOL), U.S. Pat. No. 4,485,196 (SPERANZA), U.S. Pat. No. 4,604,410, and U.S. Pat. No. 4,701,477 (ALTENBERG) have proposed to modify them by ethoxy propoxylation. Other patents such as U.S. Pat. No. 4,468,824 (GRIGSBY), U.S. Pat. No. 4,485,196 (SPERANZA), U.S. Pat. No. 4,536,522 (GRIGSBY), U.S. Pat. No. 4,459,370 (BLANPIED), U.S. Pat. No. 4,642,319 (MCDANIEL), U.S. Pat. No. 4,644,019 (MCDANIEL), U.S. Pat. No. 4,714,717 (LONDRIGAN), U.S. Pat. No. 4,760,100 (MCDANIEL), Chem. Abs. 151, 159 (PENCZEK) have proposed to operate the distillation of the MEG simultaneously and proportionately of its formation resulting from the glycolysis.

However, the polyols obtained by the aforecited methods are mixtures of polyols having a high heterogeneity or dispersion in their molecular weights and lead therefore, during their cross linking or linking to PUR or PIR, to irregular, three-dimensional cross-linked systems, which is generally considered to be an unfavorable characteristic resulting from the presence of higher oligomers having a weak hydroxyl value (<200 mg KOH/g) and of free glycols having an elevated hydroxyl value (>800 mg KOH/g). There has in addition been observed (G. TERSAC et al. in CELLULAR POLYMERS, Vol. 14, p. 14, 1995) another unfortunate consequence of this heterogeneity, i.e. a substantial increase of the viscosity.

One solution to limit the formation of higher oligomers would consist in effecting the glycolysis/esterification at elevated molar ratio of the glycol rests with respect to the diacid rests, then to eliminate the free glycols, by distillation. One would find oneself however in this case in an unbalanced chemical system, and the alcoholysis reactions would tend to reform free glycols as well as more condensed species.

A patent U.S. Pat. No. 4,758,607 (HALLMARK) describes a method permitting to eliminate the free glycols, without that they reform themselves of the MEG by rebalancing reaction; the polyols thus obtained have a very low proportion of free MEG, they are less viscous, present a better stability during storage and lead to foams having a larger density. However, the method has the inconvenience to require a high-vacuum distillation, continuously and with film scraping, which requires a very expensive installation. This patent cites numerous examples of glycols and polyols having a low molecular weight that can be utilized as glycolyzing agents, as well as numerous polyacids that can be taken as prior art to the present application. It should however be noted that the glycolysis catalyst cited (tetrabutyl orthotitanate) is not suitable for carrying out the invention.

It is recalled that the glycolysis reaction is a balanced reaction of the transesterification type. Catalysts of this reaction are well known in the art. Reference is made for example to the U.S. printed patent document 2,465,319 (WINFIELD) which cites salts such as the manganese acetates and zinc acetates or also amines such as the triethyl amines and tributyl amines. This catalysis of the glycolysis, and of the concomitant transesterification, is well mentioned in the patent U.S. Pat. No. 3,907,868 (CURRIE).

This latter patent disclosed also the manner to avoid the rebalancing of the reaction by deactivating (sequestering) the catalyst by means of agents such as phosphoric acid, phosphorous acid, aryl esters, alkyl esters, cykloalkyl esters, arylalkyl esters of these acids, the aliphatic and aromatic carboxylic acids such as the oxalic acids, citric acids, tartaric acids, terephthalic acids, tetrasodic salts of the ethylenediamine-tetracetic acid, the phenyl phosphinic acid, as well as analogous products. It is however important to note that the technique disclosed by this publication is not the technique of the present invention and does not suggest it; it does not have the same objectives enumerated hereafter since it is directed to obtain from PET not polyols but dimethylterephthalate. The deactivating agents cited in this publication are however taken as prior art in the present application.

In a general manner, the glycols as glycolysis reagents, as well as the glycolysis catalysts or transesterification catalysts and the deactivating agents cited in the above recited publications are considered as possible reagents suitable for the carrying out of the present invention.

BRIEF SUMMARY OF THE INVENTION

The general goal of the present invention is to propose a method for obtaining polyols, more particularly polyesterols, having a narrow molar dispersion, from PET waste, in simple reactors and provided with means of subjection to a low vacuum of, for example, between 1 and 50 mmHg.

The more particular objects of the invention are:
- the obtaining of liquid polyols which are stable during storage, having a sufficiently low viscosity to permit an easy manipulation, and suitable for the preparation of cellular materials PUR or PIR having a strong and durable thermal insulation capacity;
- the obtaining of polyols having a good solubilizing capacity of chlorofluorohydrocarbons (HCFC) foaming agents (expanding agents), particularly the HCFC 141b, i.e. at least 20 %-weight of HCFC 141b, without for this reason the gaseous HCFC 141b contained in the cells being able to dissolve later in the matrix PUR or PIR, thus, polyols leading to a matrix PUR or PIR having a low affinity for the HCFC;

the obtaining of polyols having a narrow molar distribution, i.e. polyesterdiols essentially comprised of oligomers, polyesters, "monomers", and "dimers" and containing very little higher oligomers and free glycols;

the obtaining of polyols having a reduced content in difunctional free glycols, compatible with multifunctional glycols capable of leading to rigid PUR systems netted after an addition of limited quantities of multifunctional polyols;

the obtaining of polyols having a functionality higher than two, at a narrow molar distribution;

the obtaining of polyols in simple reactors, i.e. having the capacities providing only for means for stirring, for the introduction of an inert atmosphere ($N_2$), for heating up to 220–240° C., for total reflux or distillation, for filling or drawing off, and being able to function under atmospheric pressure and under vacuum (pressure of 3 mmHg and more);

the obtaining of polyols with a method performing a distillation of free glycols and permitting an internal recycling of the distillate;

finally, the obtaining of polyols by a method based on the glycolysis/esterification of PET with: short reaction times and a distillation of free glycols which do not entrain rebalancing and reequilibrating reactions.

BRIEF DESCRIPTION OF THE INVENTION

According to the invention, a method for obtaining polyols comprises in a first step to react glycols, i.e. polyalcohols having a functionality at least equal to two (MEG, DEG, DPG, . . . ), on polyethylene terephthalate (PET) in the presence of a transesterification catalyst (CAT), then, in a last step, to distill the free glycols (or freed glycols) and is characterized in its generality in that a step subsequent to the first step and before or simultaneously with said last step comprises the deactivation of the glycolysis catalyst by a deactivating agent (DES).

According to a first variant (I) of the general method, a second step, called esterification, following to the first glycolysis step comprises to introduce a polyacid (PLA) or its derivatives (anhydrides, . . . ) such as for example adipic acid, phthalic anhydride, etc. into the glycolysis medium.

Preferably, a strong acid such as the phosphoric acid $H_3PO_4$, which can at the same time constitute a deactivating agent (DES) of the catalyst of the preceding step (glycolysis), is chosen for catalyzing the esterification reaction of the second step of this first variant of the method.

The esterification step, carried out under atmospheric pressure but under inert atmosphere, can be accompanied by water formation which distills off.

The following step consists in the distillation under low vacuum (3 to 40 mmHg) of the free glycols formed during the preceding steps, which distillation leaves the desired polyols in the reaction chamber; according to the hydroxyl value ($I_{OH}$) desired for these latter, one pushes the distillation all the longer because one looks for a weak $I_{OH}$ ($200 \leq I_{OH} \leq 400$, 1 h<t<3 h).

According to a second variant (II) of the general method, the second step, of esterification, consists in introducing into the glycolyzed medium one/several polyesters (PLE), such as dimethylesters (AGS), or also such as the mixture "RHODIASOLV (registered mark" of RHONE-POULENC (dimethyl adipate, dimethyl glutarate, dimethyl succinate).

The following step of distillation, under low vacuum (3 to 40 mmHg) is preceded by the introduction of the deactivating agent (DES) into the reactive medium. The deactivating agent is, still preferably, phosphoric acid. It could also be an organic derivative of phosphorus, but with a weaker activity and lower efficacy.

One will note that, still according to the invention, the distilled glycols can be recycled during a following cycle.

According to a third variant (III) permitting to achieve the recited object of obtaining polyols having a functionality higher than two, one employs polyalcohols of a functionality higher than two, for example, triols such as the glycerol (GLR) in addition to DEG and to DPG for carrying out the glycolysis; this variant, in which a maximum quantity, in relation to the other variants, of introduced PET is transformed to polyols or, in other words, in which the ratio R, or yield, $$R = \frac{\text{polyols produced}}{\text{PET introduced}}$$

is maximum, is a particularly interesting variant from the economical point of view.

According to a fourth variant (IV), which is close to the preceding variant a mixture (AGS) of dimethyl esters is employed for operating a transesterification reaction. This variant which is a little less economical than the preceding variant permits to obtain a product of a lesser viscosity.

BRIEF DESCRIPTION OF THE SEVERAL VIEWS OF THE DRAWING(S).

Figure 2:
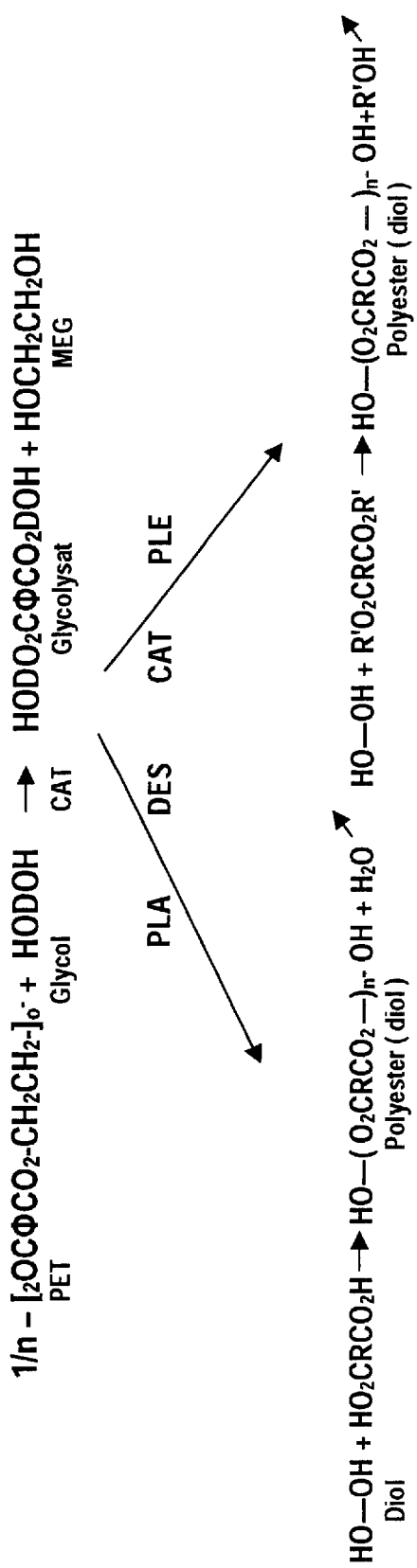

The present invention will be better understood, and details will become apparent of the description which will be given of the examples of the method in each of its variants, by reference to the figures and tables of the annexed drawings, in which FIG. 1 is a flow chart of the method in its variants I and II;

FIG. 2 shows the reactions taking place in the process of FIG. 1;

Table I furnishes characteristics and compositions of polyols obtained according to the method of the invention, and Table II furnishes characteristics of foams PUR/PIR formed from polyols obtained according to the method of the invention.

Figure 3:
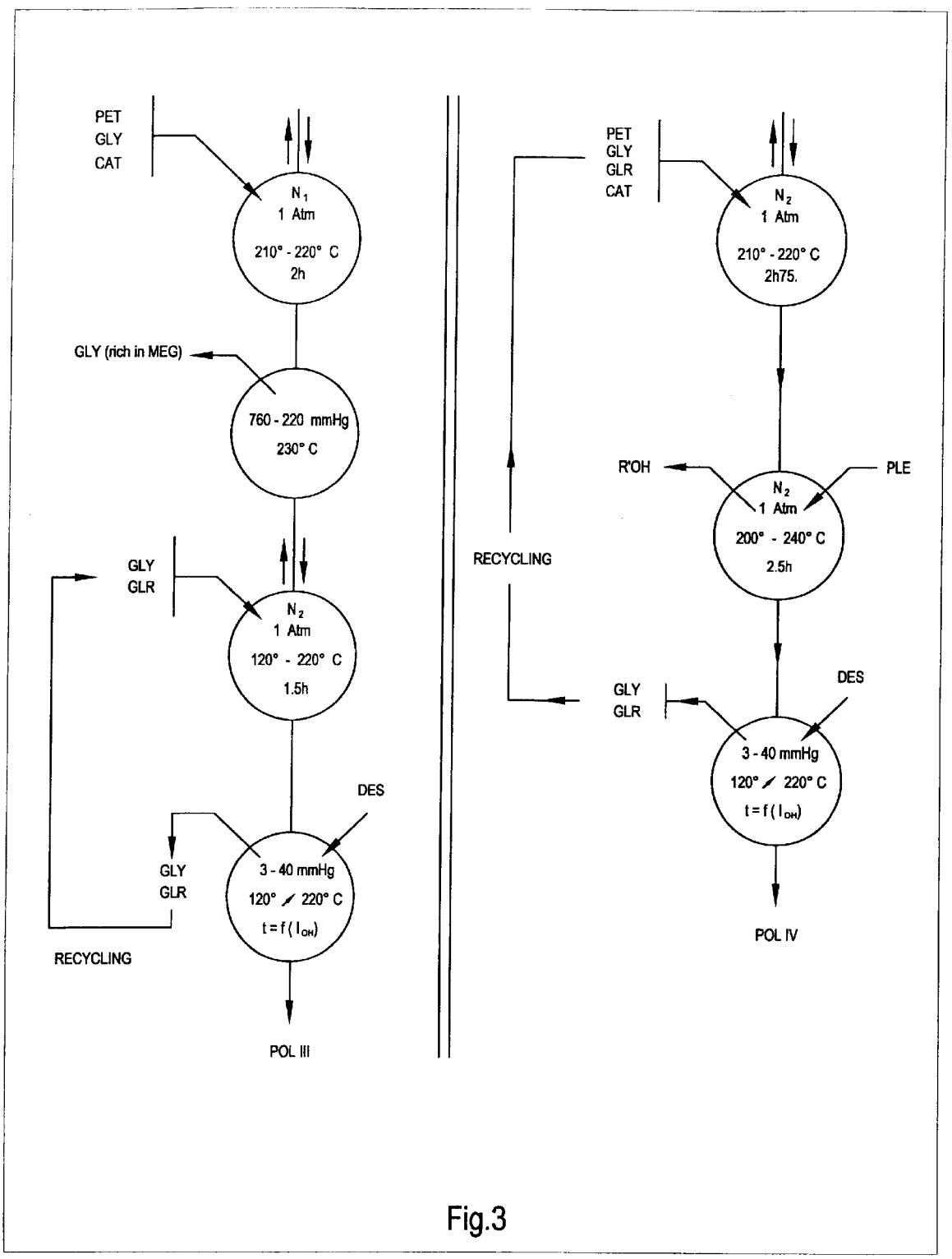

FIG. 3 is a flow chart of the method in its variants III and IV;

The diagrams of FIGS. 4 to 9 illustrate compositions of the polyesterol phase in examples of the variants I to IV before and after distillation.

DETAILED DESCRIPTION OF THE INVENTION

EXAMPLE 1

Carrying Out the First Variant
(Distillation of Free Glycols after Deactivation of the Catalyst)

One introduces into a reactor equipped with a stirrer, with a nitrogen inlet, with a total reflux condenser:

PET: 119 g (0.62 mole) (polyethylene terephthalate in the form of chips originating from manufacturing waste of preforms of bottles), DEG: 321 g (3.03 moles) (diethylene glycol)

DPG: 109.2 g (0.815 mole) (dipropylene glycol)

CAT: 0.12 g (0.49 mmole) (manganese acetate (Mn(OAc)$_2$.4H$_2$O).

One heats during 2 hours at 220° C. in a nitrogen atmosphere under total reflux. Then, after having replaced the total reflux condenser with a distillation system, one adds to the reactive medium:

| | |
|---|---|
| Adipic acid | 36.2 g (0.248 mole), |
| Phthalic anhydride | 36.7 g (0.248 mole), and |
| Phosphoric acid (H$_3$PO$_4$ at 85%) | 0.45 g (2.5 mmoles). |

One heats to at 200–240° C., with distillation of the water formed; the duration is approximately 5 hours.

The intermediary polyol obtained has the following characteristics:

| | |
|---|---|
| I$_{OH}$ (mg KOH/g) | 595 |
| I$_A$ (mg KOH/g) | 4.5 |
| free glycols | 45.2% (determined by gaseous chromatography, where: |
| MEG | 2.4% |
| DEG | 29% |
| DPG | 13.8% | polyesterols (polyesters having some hydroxyl radicals, such as polyester-diol (FIG. 2))
54.8% having the following composition (measured by steric exclusion chromatography (steric exclusion consists in preventing a reactive radical from reacting because of the location of the reactive radical among other elements which are not reactive), UV detector):
monomers (n=1): 39.5%
dimers (n=2): 37.5%
higher oligomers (n≦3): 23%

One places then the reactive chamber under a vacuum pressure of about 4 mmHg and one proceeds to the distillation of the free glycols of 570 g of the intermediary polyol, during a duration of 2.5 hours, during which the temperature of the boiler varies progressively from 140 to 160° C.

One collects 228 g of a distillate composed of:
MEG: 6%
DEG: 61.5%
DPG: 32.5%.

The distillation residue is comprises of a mixture, called Polyol-Ia, formed of free glycols and of polyesterols, of which the proportions and characteristics are given in the following:

| | |
|---|---|
| I$_{OH}$ (mg KOH/g) | 306 |
| I$_A$ (mg KOH/g) | 5.5 |
| η 25° C. (cPs) | 1600 |
| free glycols | 7.4%, where |
| MEG | about 0% |
| DEG | 6.6% |
| DPG | 0.8% |
| polyesterols | 92.6%, where |
| monomers (n = 1) | 37% |
| dimers (n = 2) | 37% |
| higher oligomers (n ≧ 3) | 26% |

REMARK IN REGARD TO EXAMPLE 1

For demonstration purposes of the interest of the invention, a polyol prepared in an identical manner (so close that the catalyst is the tetrabutyl orthotitanate (Ti(OBu)$_4$), but without adding a deactivating agent, after obtaining 235 grams of a distillate composed of:
MEG: 11.7%
DEG: 54.9%
DPG: 33.5%
is constituted of:
free glycols 12.8%, where
MEG: about 0%
DEG: 10.2%
DPG: 2.6%
polyesterols 87.2%, composed of
monomers (n=1): 23%
dimers (n=2): 23%
higher oligomers (n≦3): 54%.

It is noted that the higher oligomer proportion has markedly increased after the distillation (54% instead of 23%) as well as the quantity of MEG (235×11.7%=27.5 g instead of 570×2.4%=13.7 g), which shows that a reequilibration has taken place.

On the contrary, in the case of the preparation of the Polyol-Ia, the composition of the polyesterols has practically not changed after the distillation, and the quantity of distilled MEG (228×6%=13.7 g) is equal to the quantity present before distillation (570×2.4%==13.7 g), thereby proving that no reequilibrating has taken place, and this thanks to the carrying out of the method of the invention.

EXAMPLE 2

Carrying Out the First Variant)
(Recycling of the Distillate)

One introduces into a reactor equipped with a stirrer, with a nitrogen inlet, with a total reflux condenser:
PET: 119 g (0.62 mole) (polyethylene terephthalate in the form of chips originating from manufacturing waste of preforms of bottles),
MEG: 38.5 g (0.62 mole)
DEG: 269.3 g (2.54 moles) (diethylene glycol)
DPG: 91.6 g (0.68 mole) (dipropylene glycol)
CAT: 0.12 g (0.49 mmole) (manganese acetate (Mn(OAc)$_2$.4H$_2$O).

One heats during 2 hours at 220° C. in a nitrogen atmosphere under total reflux. Then, after having replaced the total reflux condenser with a distillation system, one adds to the reactive medium:
Phthalic anh.: 36.7 g (0.248 mole)
Adipic Acid: 36.2 g (0.248 mole),
Phosphoric acid (H$_3$PO$_4$ at 85%): 0.45 g (2.5 mmoles)

One heats at 200–240° C., with distillation of the water formed; the duration is approximately 7.5 hours.

One places then the reactive chamber under a vacuum pressure of about 3 mmHg and one proceeds to the distillation of the free glycols, of 555.3 g of the intermediary polyol, during a duration of 3 hours, during which the temperature of the boiler varies progressively from 135 to 175° C. and the temperature in the head of the column from 89 to 120° C.;

One collects 213.6 g of a distillate composed of:
MEG: 14.9%
DEG: 55%
DPG: 30%,
and a residue, referenced as Polyol-Ib, having the following characteristics and composition:

| | |
|---|---|
| $I_{OH}$ (mg KOH/g) | 310 |
| $I_A$ (mg KOH/g) | 0.8 |
| $\eta$ 25° C. (cPs) | 1650 |
| free glycols | 7.2%, where |
| MEG | about 0% |
| DEG | 6.8% |
| DPG | 0.4% |
| polyesterols | 92.8%, composed of |
| monomers (n = 1) | 39% |
| dimers (n = 2) | 36% |
| higher oligomers (n ≧ 3) | 25% |
| Compatibility with HCFC 141b | 37% |

The analysis of the distillate shows that the quantity of distilled MEG is less or equal to the initially introduced quantity of free MEG (213.6×14.9%=31.8 g instead of 38.5 g).

One adds to 200 g of the above distillate (recycling) the following quantities of pure glycols:

MEG: 8.9 g

DEG: 159.3 g

DPG: 31.6 g such as to find again quantities of free glycol identical to those initially introduced and with the same proportions as compared to other reagents, and one starts again the operations. One obtains at the end of operations a polyol referenced as Polyol-Ic having the following characteristics and composition:

| | |
|---|---|
| $I_{OH}$ (mg KOH/g) | 302 |
| $I_A$ (mg KOH/g) | 1.8 |
| free glycols | 4.6%, composed of |
| MEG | about 0% (identical) |
| DEG | 4.5% |
| DPG | 0.1% |
| polyesterols | 95.4%, composed of |
| monomers (n = 1) | 41% |
| dimers (n = 2) | 36% |
| higher oligomers (n ≧ 3) | 23% |

One therefore obtains substantially identical characteristics by using the distillate instead and in place of a mixture of pure glycols. It is concluded therefrom that the distillate is entirely recyclable and that the composition of the polyols obtained by recycling the free glycols is constant.

EXAMPLE 3

Carrying Out the Second Variant
(esterification by dimethyl esters, final distillation under 2 mmHg)

One introduces into a reactor equipped with a stirrer, with a nitrogen inlet, with a total reflux condenser:

PET: 119 g (0.62 mole) of chips originating from manufacturing waste of preforms of bottles), DEG: 321.1 g (3.03 moles), DPG: 109.2 g of (0.815 mole), CAT: 0.12 g (0.49 mmole) (manganese acetate $(Mn(OAc)_2 \cdot 4H_2O)$.

One heats during 2 hours at 220° C. in a nitrogen atmosphere under total reflux. Then, after having replaced the total reflux condenser with a distillation system, one adds to the reactive medium:

78.7 g (0.495 mole) of a mixture called AGS of the following dimethyl esters:

dimethyl adipate: about 16 weight-percent dimethyl glutarate: about 60 weight-percent dimethyl succinate: about 24 weight-percent One heats to 200° C. There is produced a transesterification with distillation of methanol. The temperature increases progressively up to 240° C. until cessation of the methanol production, i.e. after about 1.8 hours.

After cooling one adds 0.17 g phosphoric acid at 85%, i.e. 1.5 mmole, to deactivate the catalyst, and one proceeds to the distillation of the free glycols of 579.4 g of the intermediary polyol, under 3 mmHg with progressive increase to 1 hour of the temperature of boiler which passes from 125 to 180° C., and in the head of the column from 82 to 118° C.

One collects 236.6 g of a distillate composed of:

MEG: 6.8%

DEG: 60.5%

DPG: 32.6%, while the residue, referenced as Polyol-IIa, has the following characteristics and composition:

| | |
|---|---|
| $I_{OH}$ (mg KOH/g) | 307 |
| $I_A$ (mg KOH/g) | 0.4 |
| 25° C. (cPs) | 810 |
| free glycols | 4.4%, where |
| MEG | about 0% |
| DEG | 4.2% |
| DPG | 0.2% | polyesterols 95.6%, composed of monomers (n=1): 40% dimers (n=2): 37% higher oligomers (n≦3): 23%

Compatibility with the HCFC 141b: 44%

EXAMPLE 4

Carrying Out the Second Variant
(Esterification by Dimethyl Esters, Final Distillation Under 28–30 mmHg)

Under analog operating conditions as the ones mentioned above, but with a distillation pressure of 28–30 mmHg and after distillation of 232.9 of glycols, the temperature of the boiler having passed in 1.3 hours from 160 to 200° C., and in the head of the column from 125 to 148° C., the residue obtained, references as Polyol-Ib, has the following characteristics:

| | |
|---|---|
| $I_{OH}$ (mg KOH/g) | 316 |
| $I_A$ (mg KOH/g) | 0.4 |
| free glycols | 5.6, where |
| MEG | about 0% |
| DEG | 5.3% |
| DPG | 0.3% |
| polyesterols | 94.4%, composed of |
| monomers (n = 1) | 40% |
| dimers (n = 2) | 37% |
| higher oligomers (n ≧ 3) | 23% |

Table 1 of the annexes resumes the characteristics of the different polyols obtained in the examples, and furnishes their variation ranges (delta).

These ranges of characteristics identifying, separately or on combination, the polyols of practical interest for which the invention brings a substantial progress, are the following:

| | |
|---|---|
| $I_{OH}$ (mg KOH/g) | 307–320, up to 200–400, |
| $I_A$ (mg KOH/g) | 0.4–0.5, up to 0.1–10, |
| 25° C. (cPs) | 800–1700, up to 500–5000, |
| free glycols | 4% to 8%, up to 0%–10%, composed of |
| MEG | <0.2% |
| DEG | 4–7% up to 2–10% |
| DPG | 0–1% up to 0–3%, and of | polyesterols (polyesters having some hydroxyl radicals, such as polyester-diol (FIG. 2)) measured by steric exclusion chromatography (steric exclusion consists in preventing a reactive radical from reacting because of the location of the reactive radical among other elements which are not reactive.), UV detector) forming from 90 weight-% to 100 weight-%, of the polyol, and composed of monomers (n=1): 35–42%
i.e. >35%
i.e. <35%
Compatibility with the
HCFC 141b: 20–50%

EXAMPLE 5

Preparation of Polyurethane and Polyisocyanide, Starting from the Polyol-Ia

The formulations are expressed in masses relative to 100 g of mixture of polyols. The foaming agent is the HCFC 141b (FORANE F 141b of ELF-ATOCHEM); the catalysts are the dimethyl cyclohexyl amine (P8 of AIR PRODUCTS), the bis-(2-dimethyl aminoethyl) ether (NIAX Al of UNION CARBIDE) and the potassium octoate (K 15 of AIR PRODUCTS), the surfactants are copolymers poly (ether/siloxane) (DC 5454 and DC 5098 of AIR PRODUCTS).

The isocyanate mixture of Polyol-Ib for the foam formation is a PMDI (4 4'-diisocyanate of diphenyl methane), the SUPRASEC DNR of ICI, a polyisocyanate having a functionality of 2.7, the PMDI is a mixture of "formulated polyol" in the quantity corresponding to the desired value; the mixture is effected by mechanical agitation at 4000 turns/minute during 10 seconds; the reactive mixture is poured into a bag, the expansion is free.

The reactivity of the formulated polyol is distinguished by the cream time (temps de crème, tc), by the thread tire (temps de fil, tf), by the time of the end of the rise (fin de montée, tfm) and by the time of becoming gummy (temps hors poisse, tp).

The resulting foams are judged by the measure, one day after their elaboration, of their density (NFT 56107) and of their thermal conductivity (ISO 2581); the evolution of the characteristics are distinguished by comparison, after 28 days at ordinary temperature, of the initial thermal conductivity (I1j) and after stabilization (I28j), and by the dimensional retreat (Dv28j); Table II of the Annex provides the results.

The analyses of the polyesterols by steric exclusion chromatography show that no reequilibration has occurred during the second distillation.

The polyurethane and polyisocyanurate foams obtained are remarkably well adapted to the thermal insulation, their cellularity is very fine and the stability of their properties is remarkable.

EXAMPLE 6

Carrying out the Third Variant (III))

One introduces into a reactor equipped with a stirrer, with a nitrogen inlet, with a system permitting either to carry out a distillate extraction or to establish a total reflux:

PET: 288 g (1.5 moles)
DEG: 195.6 g (1.845 moles),
CAT: 0.27 g (1.1 mmole) manganese acetate One heats during 2 hours at 220° C. in a nitrogen atmosphere under total reflux and then one establishes progressively a partial vacuum and one withdraws a distillate. At the end of the operation, the pressure is 200 mmHg and the temperature of the reactor is 230° C. The obtained distillate D1 is composed of:

MEG: 54.2%
DEG: 45.8%

After cooling, one adds:

DEG: 180.2 g (1.70 moles)
DPG: 134.0 g (1.00 mole)
GLR: 55.2 g (0.60 mole)

Still under a nitrogen atmosphere, one carries out again an alcoholysis at T=220° C. during 1.5 hours. Then one adds 0.40 g of phosphoric acid at 85%, i.e. 4 millimoles for deactivating the catalyst and one proceeds to the distillation of free glycols under 10 mm Hg with progressive increase to one hour of the temperature of the mixture which passes from 132° C. to 181° C., and at the head of the column from 114° C. to 134° C. One collects 453.4 g of polyol and 264.0 g of free glycols (distillate D2).

The composition of the distillate D2 is:

MEG: 7.9%
DEG: 60.8%
DPG: 28.2%
GLR: 3.1% while the final polyol has the following characteristics:

| | |
|---|---|
| $I_{OH}$ (mg KOH/g) | 339 |
| $I_A$ (mg KOH/g) | 1.2 |
| η 25° C. (cPs) | 15200 |
| Free glycols | 5.9%, where |
| MEG | 0 |
| DEG | 1.8% |
| DPG | 0 |
| GLR | 4.1% |
| Polyesterols | 94.1% composed of: |
| monomers (n = 1) | 44% |
| dimers (n = 2) | 36% |
| higher oligomers (n ≧ 3) | 20% |

Thus, in this variant II, one proceeds after the glycolysis and before introducing the deactivating agent and distillation of the free glycols, in the first place to a distillation at high temperature of a part of the free glycols, which permits the elimination of a large proportion of MEG, and in the second place, possibly to a new transesterification step following to a supplemental admixture of glycols and polyalcohols of a functionality of f>2.

EXAMPLE 7

Carrying Out the Fourth Variant (IV))

One introduces into a reactor equipped with a stirrer, with a nitrogen inlet, with a total reflex condenser:

PET: 238 g (1.24 moles)
DEG: 64.2 g (6,06 moles),
DPG: 218.4 g (1.63 moles)
GLR: 68.0 g (0.74 mole)
CAT: 0.24 g (0.49 mmole)

One heats during 2 hours 45 min. at 220° C. in a nitrogen atmosphere under total reflux.

Then, after having replaced the total reflux condenser with a distillation system, one adds to the reactive medium 157.4 g (0.99 mole) of a mixture of dimethyl esters (AGS) of the following composition:

dimethyl adipate: 16 weight-percent
dimethyl glutarate: 60 weight-percent
dimethyl succinate: 25 weight-percent One heats to 200° C., a transesterification reaction is produced with distillation of methanol. The temperature increases progressively to 240° C. until the production of methanol ceases, i.e. after about 2.5 hours.

After cooling, one adds 0.34 g phosphoric acid at 85% (3.0 mmole) to deactivate the catalyst and one proceeds to the distillation of free glycols under 10 mmHg with a progressive increase to 1.25 hours of the temperature of the boiler which passes from 117.5° C. to 180° C. and at the head of the column from 105° C. to 134° C. One collects 561.6 g of distillate composed of:

MEG: 10.0%
mDEG: 63.7%
DPG: 23.9%
GLR: 2.4% whereas the final polyol, designated as polyol VI, possesses the following characteristics and composition:

| | |
|---|---|
| $I_{OH}$ (mg KOH/g) | 299 |
| $I_A$ (mg KOH/g) | 0.61 |
| η 25° C. (cPs) | 1350 |
| free glycols | 4.3% where |
| MEG | 0.1% |
| DEG | 2.3% |
| DPG | 0 |
| Glycerol | 1.9% |
| polyesterols | 95.7% comprised of |
| monomers (n = 1) | 49% |
| dimers (n = 2) | 36% |
| higher oligomers (n ≧ 3) | 15% |

Thus, in this variant IV, one applies also in addition to DEG and DPG, on the one hand, polyalcohols of a functionality f<2, and, thereafter, a transesterification by means of a mixture AGS of dimethyl esters to effect the glycolysis.

The diagrams of the figures that follow illustrate the evolution of the composition of the obtained polyesterol phase, before (diagram - - -) and after (diagram . . . ) the final distillation. The analysis of the composition of the polyesterol phase of the polyol has been carried out by steric exclusion chromatography coupled with a UV detector. The chromatograms relative to Example 1 and to the remarks associated to this example, a column "LICROGEL PS4 (5 μ) of MERCK has been employed; for all the other chromatograms, a column SDV 100Å MZ has been employed.

Thanks to the calibration with a mixture DGT+BDT (compare thesis F. Hubert "valorisation chimique de déchets polyéthylènephtalate en matériaux polyuréthane pour isolation thermique" [Chemical evaluation of polyethylene terephthalate waste into polyurethane materials for thermal insulation] E.C.P. October 1996), the respective quantities of oligomers (n≧3), of dimers, and of monomers can be determined.

Figure 4:
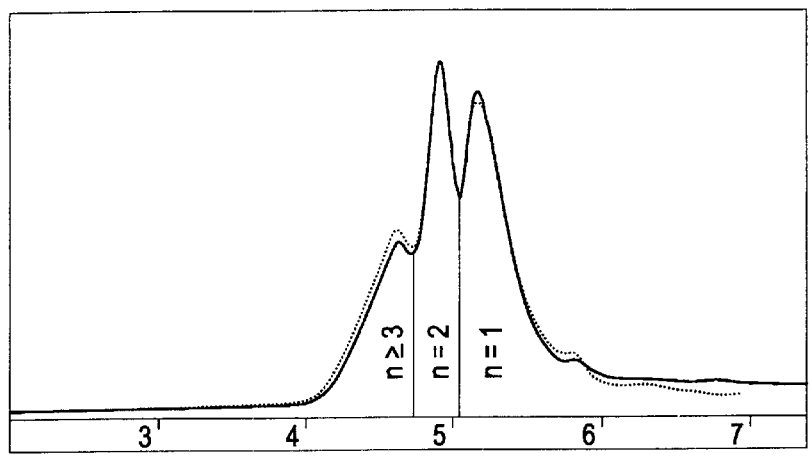

The diagram of FIG. 4 corresponds to the Example 1 for carrying out the first variant.

Figure 5:
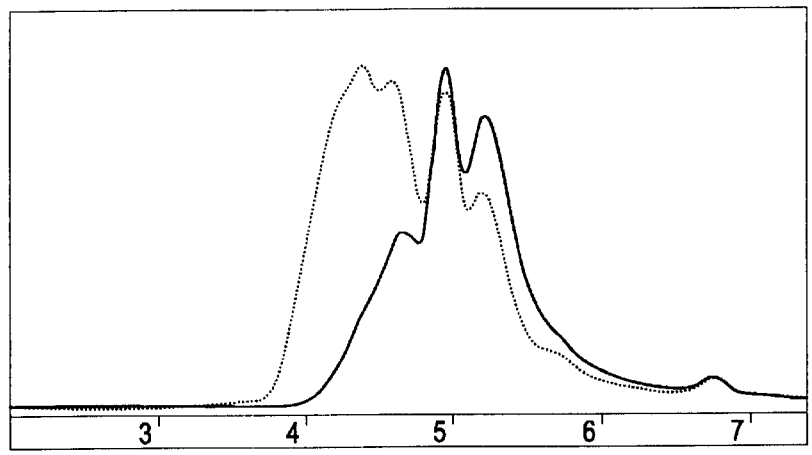

On the diagram of FIG. 5, which is to be compared to the diagram of the preceding figure, a substantial shifting is noted toward the start of the elution due to the strong presence of higher oligomers resulting from the reequilibrating in the presence of the deactivating agent DES.

Figure 6:
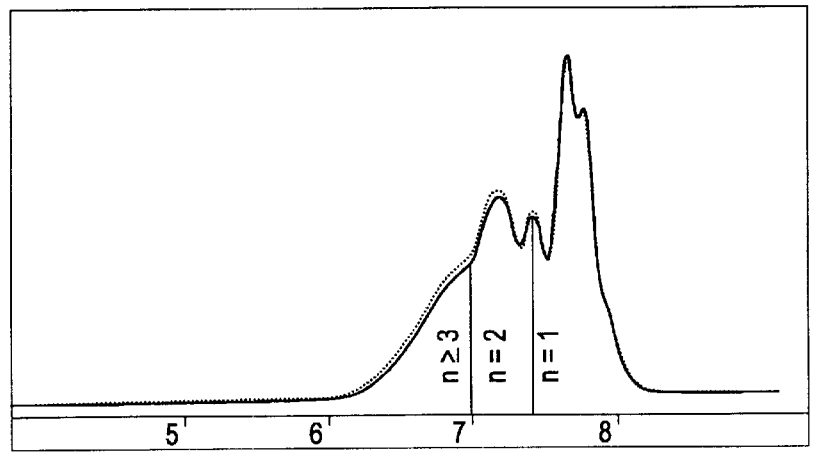

The diagram of FIG. 6 corresponds to Example 2 for carrying out the first variant.

Figure 7:
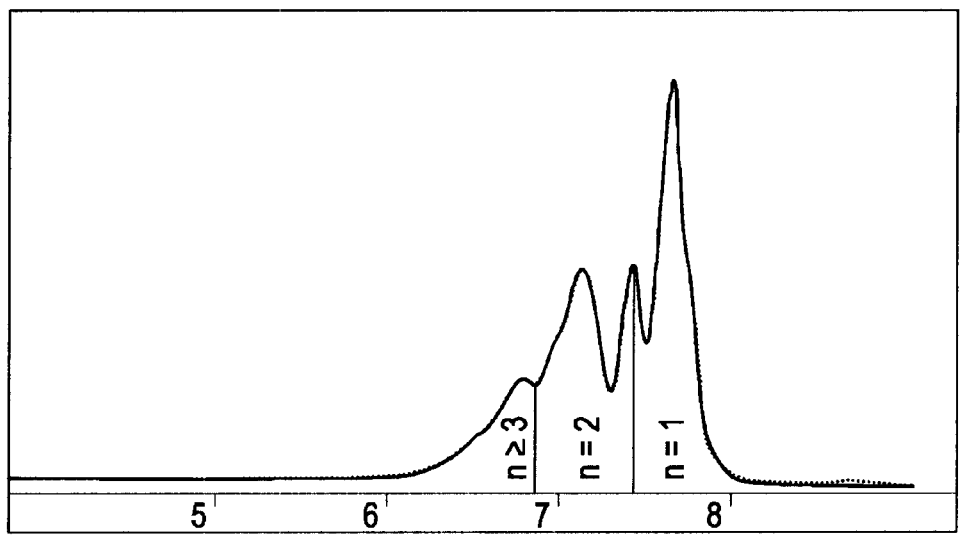

The diagram of FIG. 7 corresponds to Example 3 for carrying out the second variant.

Figure 8:
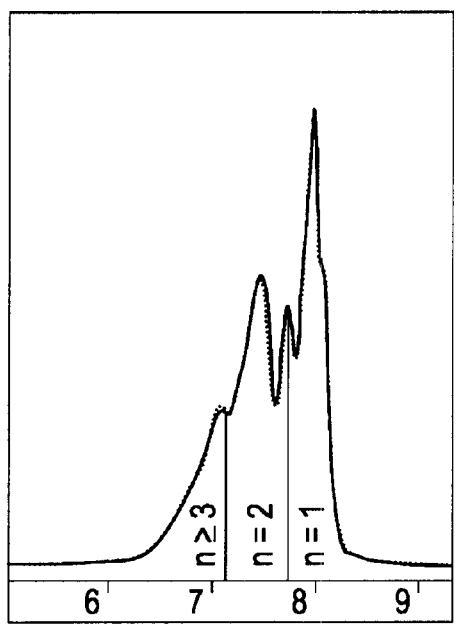

The diagram of FIG. 8 corresponds to Example 6 for carrying out the third variant.

Figure 9:
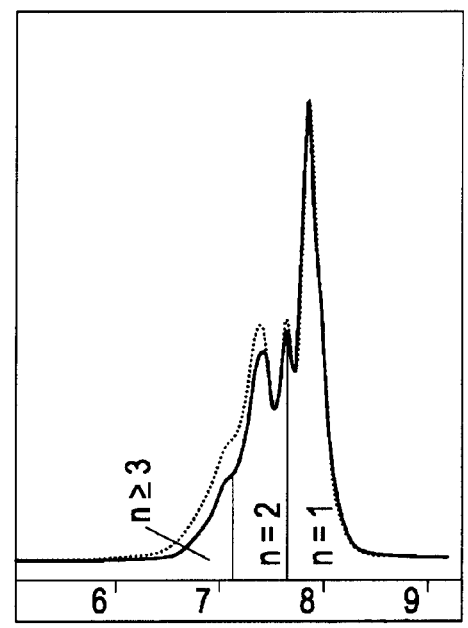

The diagram of FIG. 9 corresponds to Example 7 for carrying out the fourth variant.

The forms of these diagrams, from which are derived the compositions in % of the polyesterols of the above described examples, are characteristic of the method of the invention and are suggestive for carrying out the invention for a polyesterol mixture.

The invention finds a particularly advantageous application in the thermal insulation, in particular of buildings.

Even though examples for obtaining polyols according to the method of the invention have been described, as well as examples for the preparation of foams from one of these polyols, it has to be understood that the scope of the invention is not limited to these examples, but that it extends to any form of carrying out the method and its applications, such that its method steps are defined above in a general way.

We claim:

1. A method for producing polyols, consisting of a first step in reacting polyalcohols on the polyethylene terephthalate (PET) in the presence of a catalyst (CAT) of transesterification then, in a last step, to distill the free glycols, wherein a step following to the first step and before or simultaneously to the said last step comprises the deactivation of the glycolysis catalyst by a deactivating agent (DES), from where there results:

in the first place, a substantially narrow molar distribution of the obtained polyols and/or the absence of reequilibrating reactions, in the second place, that the final distillation of the free glycols can be carried out without rebalancing, under low vacuum (3 mmHg<P<30 mmHg) requiring only an ordinary installation.

2. The method for producing polyols according to claim 1, wherein the catalyst (CAT) of the glycolysis reaction is a member of the group consisting of zinc acetate and manganese acetate, amines, and wherein a deactivating agent (DES) of the deactivating reaction is a member of the group consisting of phosphoric acid, phosphorous acid, arylic esters, alkylic esters, cycloalkylic esters, arylalkylic esters of these acids, aliphatic and aromatic carboxylic acids.

3. The method for producing polyols according to claim 2, wherein the selected deactivating agent is phosphoric acid at 85% concentration.

4. The method for producing polyols according to claim 1, wherein (variant (I)) a second step, called esterification, following to the first step of glycolysis comprises introducing into the glycolyzed medium a polyacid (PLA) and/or its derivatives and the deactivating agents (DES), then bringing the reactive medium to a temperature comprises between 170 and 240° C. under inert atmosphere, by distilling the formed water, and in that the last step comprises in distilling the free glycols under vacuum (3 mm HG<P<40 mm HG) at a temperature comprised between 120 and 220° C.

5. The method for producing polyols according to claim 1, wherein (variant II) the second step, or esterification step, comprises introducing one/several polyesters (PLE) into the glycolyzed medium, and bringing the reactive medium to a temperature disposed between 170 and 240° C. under inert atmosphere, by distilling the formed alcohol, then introducing the deactivating agent (DES) into the reactive medium, then constituting the last step, distilling the free glycols under vacuum (3 mmHG<P<40 mmHg) at a temperature disposed between 120 and 220° C.

6. A polyol produced according to a method corresponding to any one of the preceding claims, wherein the following conditions hold:

IOH: comprised between: 200 and 400 mg KOH/g
IA comprised between: 0.1 and 10 mg KOH/g
25° C. (cPs) comprised between: 500 and 5000,
Compatibility HCFC 141b: comprised between 20–50%
free glycols (measured by gaseous chromatography) comprised between: 0 and 10%, where MEG is less than 0.3%,
polyesterols forming between: 92 and 100% of the weight of the polyol of composition (measured by steric exclusion chromatography, UV detector):
monomers (n=1): >35%
higher oligomers (n>3): 35%.

7. The polyol according to claim 6, comprising at least at the trace state
at least one of the bodies of the group comprising the manganese (Mn) and the zinc (Zn), as rest of the catalyst (CAT), and
phosphorous (P) as rest of the deactivating agent (DES).

8. The method for producing polyols according to claim 1, wherein (variant III), before introduction of the deactivating agent and distillation of the free glycols: one proceeds following to the glycolysis to a distillation at high temperature of one part of the free glycols, which allows elimination of a large proportion of MEG, and secondly, one proceeds to a new step of transesterification following an addition of glycols and of polyalcohols having a functionality of f>2.

9. The method for producing polyols according to claim 8, wherein a polyalcohol having a functionality higher than two is the glycerol (GLR).

10. The method for producing polyols according to claim 1, wherein (variant IV) one carries out to perform the glycolysis, in addition to the DEG and to the DPG, polyalcohols having a functionality of f>2 and in the following a transesterification by means of a mixture of dimethyl esters.

11. A method for producing polyols comprising reacting polyalcohols on polyethylene terephthalate (PET) in the presence of a catalyst (CAT) of transesterification for performing a glycolysis reaction; deactivating the catalyst (CAT) of transesterification by a deactivating agent (DES);
distilling off free glycols without rebalancing, under low vacuum (3 mmHg<P<30 mmHg) requiring only an ordinary installation for obtaining a substantially narrow molar distribution of the obtained polyols and an absence of reequilibrating reactions.

12. The method for producing polyols according to claim 11, wherein the catalyst (CAT) of the glycolysis reaction is a member of the group consisting of zinc acetate and manganese acetate, amines, and
wherein the deactivating agent (DES) of a deactivating reaction is a member of the group consisting of phosphoric acid, phosphorous acid, arylic esters, alkylic esters, cycloalkylic esters, arylalkylic esters of these acids, aliphatic and aromatic carboxylic acids.

13. The method for producing polyols according to claim 12, wherein the deactivating agent is phosphoric acid.

14. The method for producing polyols according to claim 11, further comprising introducing into a glycolyzed medium a polyacid (PLA) or its derivatives as the deactivating agents (DES) following to the step of glycolysis reaction;
bringing the reactive medium to a temperature comprised between 170 and 240° C. under an inert atmosphere for distilling the formed water; and
distilling off free glycols under vacuum (3 mm HG<P<40 mm HG) at a temperature comprised between 120 and 220° C.

15. The method for producing polyols according to claim 11 further comprising
introducing polyesters (PLE) into a glycolyzed medium;
bringing the reactive medium to a temperature disposed between 170 and 240° C. under inert atmosphere for distilling a formed alcohol;
introducing the deactivating agent (DES) into the glycolyzed medium;
distilling free glycols under vacuum (3 mmHG$\leq$P$\leq$40 mmHg) at a temperature disposed between 120 and 220° C.

16. The method for producing polyols according to claim 11 wherein a polyol is produced while the following conditions hold:
$I_{OH}$: comprised between: 200 and 400 mg KOH/g
$I_A$ comprised between: 0.1 and 10 mg KOH/g
25° C. (cPs) comprised between: 500 and 5000,
Compatibility HCFC 141b: comprised between 20–50%
free glycols (measured by gaseous chromatography) comprised between: 0 and 10%, where
MEG is less than 0.3%,
polyesterols forming between: 92 and 100% of the weight of the polyol of composition (measured by steric exclusion chromatography, UV detector):
monomers (n=1): >35%
higher oligomers (n>3): 35%.

17. The method for producing polyols according to claim 11 wherein the produced polyol comprises at least at the trace state
at least one of the bodies of the group comprising manganese (Mn) and zinc (Zn), as a residue of the catalyst (CAT), and
phosphorous (P) as a residue of the deactivating agent (DES).

18. The method for producing polyols according to claim 11 further comprising distilling off at a high temperature part of free glycols following to the glycolysis reaction and thereby allowing an elimination of a large proportion of mono ethylene glycol MEG; and adding glycols and polyalcohols having a functionality of f<2 to a residue and performing a second glycolysis reaction.

19. The method for producing polyols according to claim 18, wherein a polyalcohol having a functionality higher than two is glycerol (GLR).

20. The method for producing polyols according to claim 1 further comprising
performing reacting by employing
diethylene glycol,
dipropylene glycol, and
polyalcohols having a functionality of f<2;
following up with a secondary glycolysis by employing a mixture of dimethyl esters.

* * * * *